United States Patent [19]
Pinto

[11] 3,774,865
[45] Nov. 27, 1973

[54] FLYING SAUCER
[76] Inventor: Olympio F. Pinto, Rua Visconde de Ouro Preto, 63, Rio De Janeiro, Brazil
[22] Filed: Jan. 3, 1972
[21] Appl. No.: 214,653

Related U.S. Application Data
[63] Continuation-in-part of Ser. No. 40,596, May 26, 1970, abandoned.

[52] U.S. Cl............................ 244/23 C, 244/42 CG
[51] Int. Cl............................................. B64c 29/00
[58] Field of Search............... 244/12 R, 12 C, 23 R, 244/23 C, 62 XR, 1 SS; 310/5, 6

[56] References Cited
UNITED STATES PATENTS

| 2,949,550 | 8/1960 | Brown............................ 244/62 XR |
| 3,022,430 | 2/1962 | Brown.................................... 310/5 |
| 3,022,963 | 2/1962 | Frost et al............................ 244/15 |
| 3,339,863 | 9/1967 | Nicklas et al..................... 244/1 SS |
| 3,614,481 | 10/1971 | Halliday................................. 310/6 |
| 3,632,065 | 1/1972 | Rosta............................... 244/12 C |

FOREIGN PATENTS OR APPLICATIONS
678,700   11/1959   Canada............................ 244/23 C OTHER PUBLICATIONS
Graff, R. F. Modern Dictionary of Electronics; 3rd Ed. p. 569.

Primary Examiner—Duane A. Reger
Assistant Examiner—Jesus D. Sotelo
Attorney—Keith D. Beecher

[57] ABSTRACT

A flying saucer type of aircraft or water vehicle is provided, which may take the form of a toy, or of an actual full-sized passenger and cargo carrying vehicle. The vehicle of the invention includes a cicular-shaped body comprising an outer rim portion and an inner hub portion, and upper and lower groups of rotor helicopter-like blades, each formed into a disc-shaped configuration, and rotatable about the central vertical axis of the hub in the annular space between the hub and rim. The helicopter blades are mounted on fluid bearings in the body, and are rotatably driven by turbine action. The two groups of helicopter blades define a pressurized chamber therebetween. Exhaust ports are provided on the rim which may be selectively opened to control the attitude of the vehicle, as well as to maneuver and control the direction of movement of the vehicle, once it is airborne. The pitch of the rotor helicopter blades is controllable, so that the pressurized fluid in the aforesaid chamber may be directed through the top or bottom of the assembly to control the lift or descent of the vehicle.

5 Claims, 12 Drawing Figures

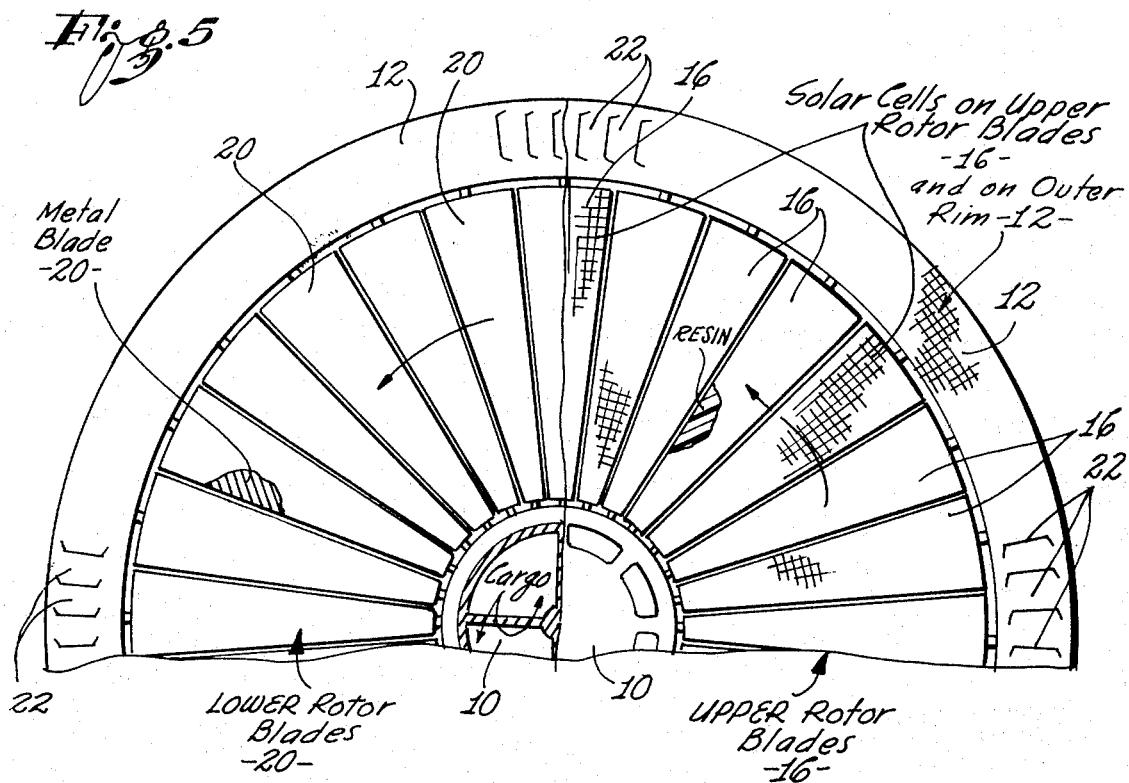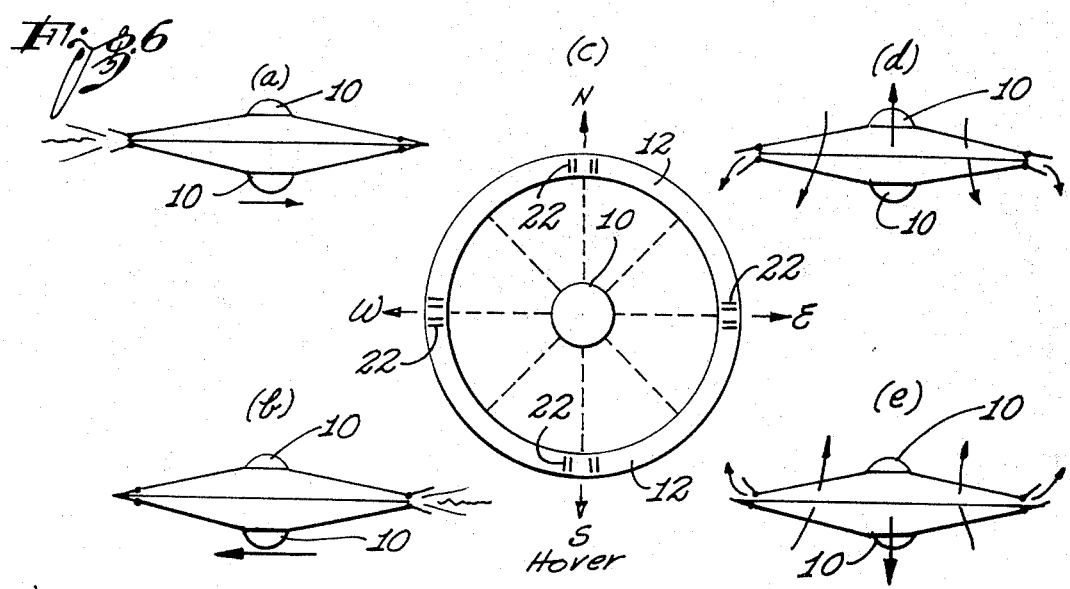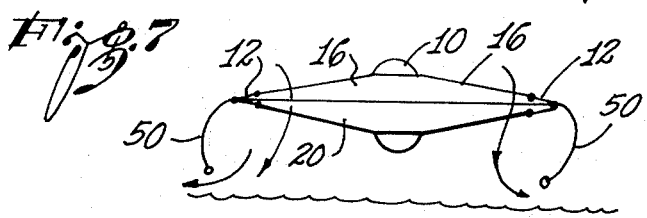

FLYING SAUCER

CROSS REFERENCE TO RELATED APPLICATIONS

This application is a continuation-in-part of copending application Ser. No. 40,596, which was filed May 26, 1970, in the name of the present inventor and is now abandoned.

BACKGROUND OF THE INVENTION

The usual present day aircraft comprises a fuselage and a pair of wings, the wings being attached to the fuselage and extending outwardly on either side thereof. Such an aircraft is normally propelled through the air by means of a propeller or jet engines mounted on the wings, or elsewhere on the aircraft. The present day helicopter, on the other hand, comprises a central cabin, with rotating blades supported above the cabin, the blades having controllable pitch so as to provide lift and directional movement to the helicopter.

Disc-shaped vehicles are also known to the art, which incorporate some of the principles of the present day helicopter, and which are popularly designated as "flying saucers." Such vehicles are described, for example, in Canadian Patent No. 678,700 which issued Jan. 28, 1964; as well as in U.S. Pat. Nos. 3,395,876 and 3,437,290. However, difficulties have been encountered in the vehicles of the prior art, such as those described in the aforesaid patents, in providing appropriate means for driving the rotating helicopter blades in the vehicles without adding excessively to the weight of the vehicle or to the complexity of the drive mechanism. Difficulties also have been encountered in providing adequate attitude control for the vehicle, and adequate pitch control for its helicopter blades.

The vehicle of the present invention, like the prior art vehicles described in the aforesaid patents, incorporates some of the principles of the present day helicopter. The vehicle to be described has a disc-shaped "flying saucer" configuration, and it is capable of vertical ascents and descents, and of hovering over fixed locations. In addition, the vehicle of the invention exhibits excellent maneuverability characteristics and can readily be flown in any desired direction when it is airborne. The vehicle also incorporates simple and efficient attitude controls. Moreover, the vehicle of the invention may be constructed to exhibit amphibious characteristics, and to be propelled over the surface of water; or it may even be submersible, if so desired.

The embodiment of the invention to be descibed includes additional features in the form of solar cells and static electric generating means mounted directly on the helicopter blades, so as to constitute a source of electricity for the vehicle, as well as a means to facilitate movement of the vehicle through the air or water. This is an important feature, since weight is at a premium in vehicles of the type under consideration, and an appropriate source of power normally requires excessive weight. By the construction to be described, the vehicle itself operates as an electric generating source, so that adequate power is available with no significant addition in weight.

The saucer-like vehicle of the invention, as mentioned above, incorporates two groups of rotor helicopter-like blades. In the particular embodiment to be described herein, these blades are mounted in a simple and expeditious manner on appropriate air bearings in the body of the vehicle so as to provide a simple low friction rotational support therefor. As also mentioned, the rotor blades are driven in a simple and efficient manner by turbine means, which is combined with the air bearings. By such a drive, the overall weight of the vehicle is maintained at a minimum, as is the mechanical complexity thereof.

As also explained, the upper and lower groups of rotor helicopter blades of the vehicle define an enclosed chamber in the annular space between the central hub and the outer rim. This chamber is pressurized by varying the pitch of the rotor blades, so that the amount of air passing downwardly or upwardly through the chamber may be controlled so as to control the ascent or descent of the vehicle.

Also, vents are provided at the rim of the vehicle which may be selectively opened to create pressurized jets, as the pressurized fluid within the chamber passes through the opened vents, so as to control the attitude, maneuverability, and direction of travel of the vehicle, in a simple and uncomplicated method. The attitude control vents described above, which are supplied with pressurized fluid from the chamber between the upper and lower groups of helicopter blades, are useful for slight or delicate movements of the vehicle. Additional attitude and maneuverability control vents may be provided in the rim which are supplied with high pressure fluid from an appropriate compressor, for example, for quick movements of the vehicle.

SUMMARY OF THE INVENTION

A flying saucer, helicopter-type vehicle is provided which has no mechanical connection between the rotor blades and frame of the vehicle, and in which the rotor blades are suspended by air bearings, and rotated by an air turbine. Attitude control of the vehicle is effectuated by pressurized air jets which issue from the rim of the vehicle, and which may be selectively controlled to direct the vehicle in selected directions and to control the attitude of the vehicle. These features of the vehicle of the invention make it economically and industrially feasible.

BRIEF DESCRIPTION OF THE DRAWINGS

FIG. 5 is a fragmentary top plan view of a part of the vehicle, partly broken away to reveal the structure of the radial rotor helicopter blades of the vehicle of the invention;

FIGS. 6A–6D are schematic representations showing the maner in which the vehicle of the invention may be maneuvered; and FIG. 7 shows the vehicle with a retractable flexible skirt which may be lowered from the rim to permit the vehicle to hover, for example, closely over the surface of a body of water.

DETAILED DESCRIPTION OF THE ILLUSTRATED EMBODIMENTS

Figure 1:
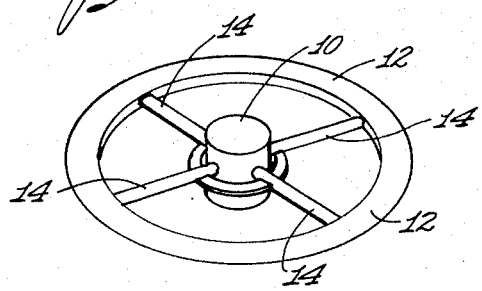
FIG. 1 is a top perspective view of the basic frame structure of the invention.
Figure 2:
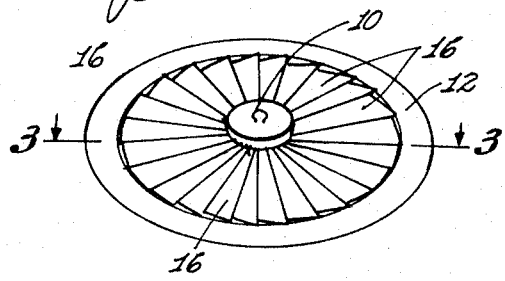
FIG. 2 is a top perspective view showing one embodiment of the saucer-like vehicle of the invention.
Figure 3:
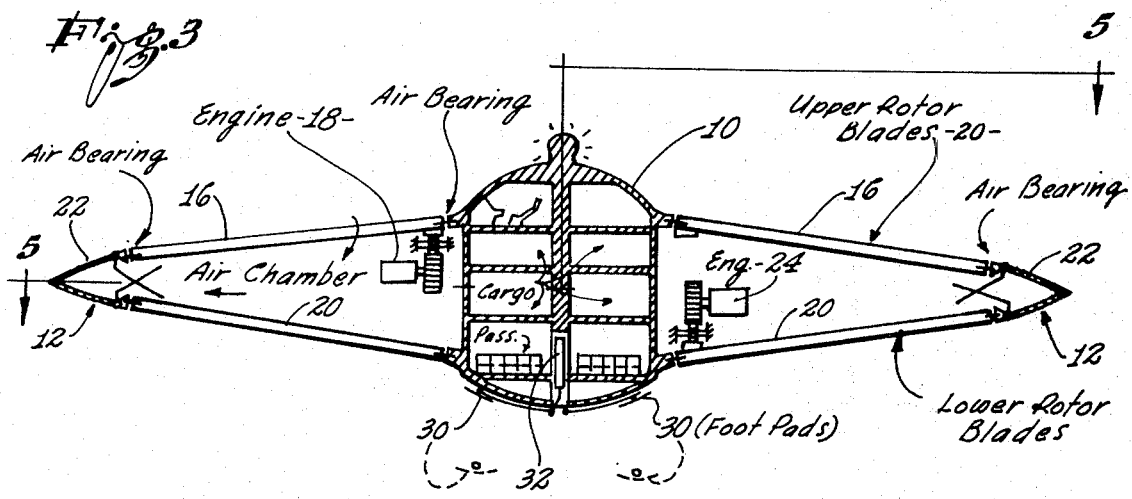
FIG. 3 is a cross-section of the embodiment of FIG. 2, taken along the lines 3—3 of FIG. 2, and on an increased scale with respect to FIG. 2.

The saucer-like vehicle illustrated in FIGS. 1–3, for example, includes a central hub 10 and an outer rim 12, which, together, constitute the body of the aircraft. The hub 10 and rim 12 both have circular configurations, and they are mounted in concentric relationship by means, for example, of a plurality of radial struts 14, as shown in FIG. 1. The rim and struts may be hollow and filled with light gas to aid in the buoyancy of the vehicle.

The annular space between the hub and rim of the vehicle is enclosed by an upper group of helicopter-like rotor blades 16, and by a lower group of helicopter rotor blades 20. The two groups of blades form a pressurized chamber therebetween, as shown in FIG. 3. The outer rim of the said chamber is hermetically sealed, so that the chamber may be pressurized, for reasons to be explained.

The upper disc-shaped group of rotor helicopter-like blades 16 (FIG. 2) extend radially outwardly from the hub 10 toward the rim 12, the blades 16 being rotatable in one direction about the central vertical axis of the hub 10. The rotor blades 16 are driven, for example, by an air turbine, as will be described. The lower group of rotor helicopter blades 20 extend radially out from the lower end of the hub 10 to the rim 12, and the lower blades are rotatable in the opposite direction from the blades 16 about the vertical axis of the hub 10. The lower group of helicopter blades 20 is also driven by an air turbine, as will be described.

Figure 3A:
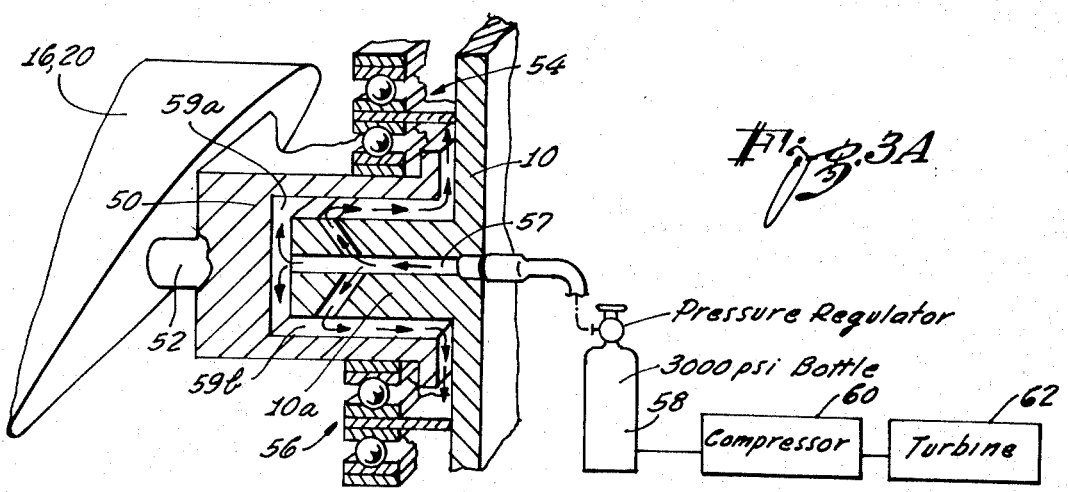
FIGS. 3A and 3B are perspective fragmentary sections illustrating portions of an air turbine which is used to drive the rotor which supports the helicopter blades of the vehicle.
Figure 3B:
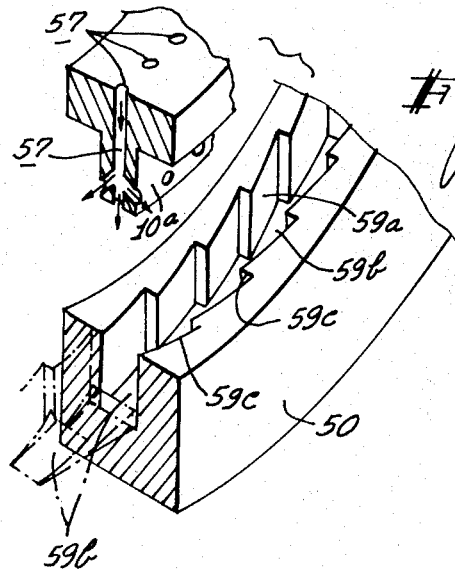

As best shown in FIGS. 3A and 3B, for example, the helicopter blades 16 are actually mounted at their inner ends on a rotor ring 50 which is rotatably supported in air bearings for rotation about a radial peripheral stub 10a on the hub 10; the stub being concentric with the central vertical axis of the hub. The lower blades 20 are supported on a similar ring which rotates about a similar stub at the lower end of the hub 10. Each of the blades 16 and 20 in the upper and lower groups is supported on the ring 50 by means, for example, of a shaft 52, so that the individual blades may be rotated about its longitudinal axis to control its pitch. The blades 16 and 20 are also supported in respective rotor rings, similar to the ring 50, at their outer ends for rotation in similar air bearings at the rim 12. Ball bearings 54, 56 are also mounted on the hub 10 to support the rotor rings, such as the ring 50, when the vehicle is at rest.

High pressure compressed air derived, for example, from a pressurized source 58, is driven through vents 57 in the peripheral stub 10a and into the space between the stub and rotor ring 50 to serve, not only as an air bearing for the rotor, but also as a turbine. The turbine serves to drive the rotors 16 and 20 about the vertical axis of the hub 10. The pressurized air jets issuing from the vents in the stub 10a coact with three different sets of turbine blades 59a, 59b and 59c, formed on the base and side walls of a peripheral groove in the rotor ring 50. In this manner, a three-way air bearing turbine is provided which supports the rotor ring 50 on an air film, and which also drives the rotor ring 50 and the attached rotor blades 16 about the vertical axis of the hub 10. Duplicate air bearing turbines may be provided at the upper and lower ends of the hub 10 for respectively driving the rotor blades 16 and 20, and duplicate air bearing/turbine combinations may be provided at the outer rim for the same purpose.

As illustrated schematically in FIG. 3A, the pressure source 58 may be in the form of an air bottle which is established at 3000 psi pressure by means of a compressor 58 which, in turn, may be driven by an appropriate turbine 62.

Figure 4:
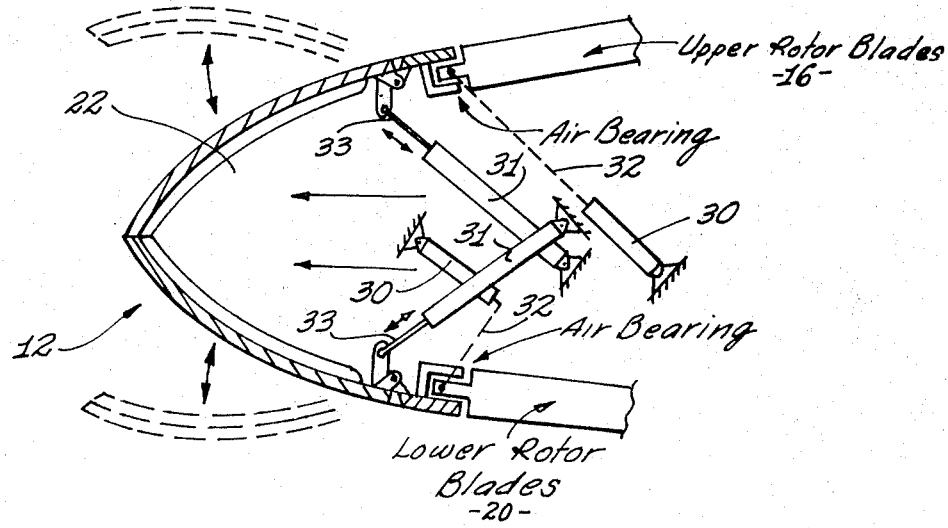
FIG. 4 is a fragmentary sectional view, on an enlarged scale, and showing an appropriate mechanism for controlling the pitch of the aforesaid helicopter rotor blades, and for selectively opening and closing vents in the rim of the vehicle for attitude and maneuverability control.

The pitch of the helicopter blades 16 and 20 may be controlled by appropriate control mechanisms, such as cylinders 30 shown in FIG. 4, which are coupled by means of appropriate linkages 32 to the various blades. The cylinders 30 may be actuated in any appropriate manner, so as to provide any desired pitch to the blades 16 of the upper group, or to the blades 20 of the lower group, and thereby control the ascent or descent of the vehicle.

Figure 4A:
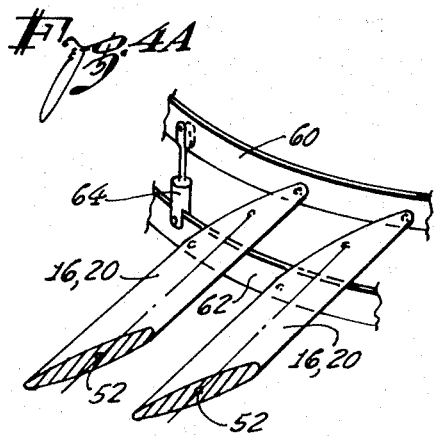
FIG. 4A is a fragmentary perspective representation showing an alternate mechanism for controlling the pitch of the aforesaid helicopter blades.
Figure 4B:
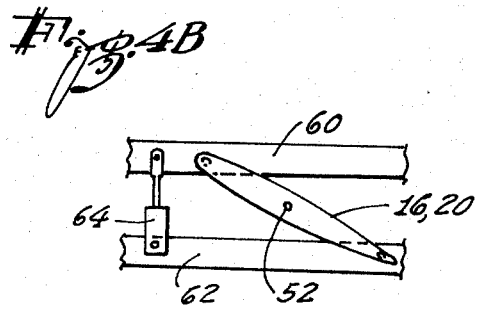
FIG. 4B is a fragmentary elevational view of the mechanism of FIG. 4A.

As an alternate pitch control, and as shown in FIG. 4A and 4B, the blades 16 and 20 may be individually supported between rings 60 and 62 at each end of each blade in the respective groups. The spacing between the rings 60 and 62 may be controlled by an appropriate hydraulic air cylinder 64 which, like the air cylinders 30 and 31, may be controlled by any appropriate means so as to control the spacing between the rings 60 and 62, and the resulting rotation of the blades 16 and 20 about their individual shafts 52.

Figure 4C:
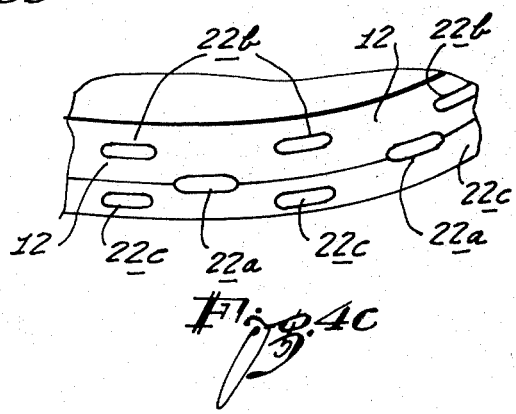
FIG. 4C is a fragmentary elevational representation of a part of the rim of the vehicle showing the displacement of the various vents from which the maneuverability and attitude control jets issue.

Groups of exhaust vents designated 22 are provided in the rim 12, and these vents may be positioned in the manner shown in FIG. 4C. Specifically, certain vents 22a are positioned at the extremity of the rim, so that when such vents are opened, the resulting air jets extend radially in the general plane of the vehicle. Other vents 22b are provided in the upper face of the rim 12, so that when the vents 22b are selectively opened, air jets extending up from the plane of the vehicle issue therefrom. Still further vents 22c are provided in the lower surface of the rim, and when the latter vents are selectively opened, the resulting air jets extend down from the plane of the vehicle. As will be described, the selective opening of the jets 22a, 22b and 22c provides an effective means for controlling the attitude of the vehicle, as well as to maneuver the aircraft and to control its direction of flight.

The exhaust vents 22a, 22b and 22c may be selectively opened and closed by air cylinders, such as the air cylinders 31, and by appropriate linkages 33, for example, as shown in FIG. 4. Certain of the air vents 22 may be connected to the interior of the chamber between the hub 10 and the rim 12, so that when such vents are opened, pressurized fluid in the chamber is caused to be discharged through the open vents as jets. For example, when jets 22a at selected annular positions on the periphery of the rim 12 are opened, the aircraft is caused to move in a desired direction. In addition, the attitude of the craft may be controlled, or the vehicle may be maneuvered, when selected vents 22b and 22c are opened on the upper or lower surface of the rim. Others of the vents may be connected directly to a high pressure compressed source, for rapid speed or maneuverability of the vehicle. The chamber between the rotor blades 16 and 20 may be pressurized from any appropriate source.

The various movements of the vehicle under the control of the vents 22 are illustrated in the schematic representation of FIG. 6. For example, in FIG. 6A, the left hand group of upper and lower vents 22b and 22c are opened (or vents 22a are opened) to cause the vehicle to move to the right; in FIG. 6B, the right hand group of the upper and lower vents 22b and 22c (or vents 22a) are opened to cause the vehicle to move to the left. In FIG. 6C, all the lower vents 22c are opened to cause the vehicle to hover over a particular location. In FIG. 6D, all the upper vents 22b are closed, and all the lower vents 22c are opened, and the pitch of the upper and lower helicopter blades 16 and 20 is adjusted to a position so that air is drawn in through the top of the annular chamber between the hub 10 and rim 12 and discharged out through the bottom of the chamber and through the lower vents 22c, as shown by the arrows, so as to cause the vehicle to move directly upwardly. In FIG. 6E, the pitch of the helicopter blades is adjusted and the upper vents 22b are opened, so that the opposite situation occurs, and the vehicle is moved directly down. As mentioned above, the attitude of the aircraft, for example the pitch and roll thereof, may be controlled by selectively opening the upper and lower vents of the different groups.

In the vehicle of the invention and as described, the drive and support of the helicopter blades is relatively simple and economically feasible. Likewise, the pitch control of the blades is achieved by relatively simple mechanical means, which can be remotely controlled in a variety of ways known to the art. In the construction described above, the upper rotor blades 16 have a synchronous pitch for all blades, and the lower blades have a synchronous pitch, when the control is achieved through the rings 60 and 62, as described in conjunction with FIGS. 4A and 4B. Because of the resulting perfectly symmetrical pitch between all the blades, they have a gyroscopic effect which is useful to stabilize and navigate the vehicle.

Another feature of the structure described above is that the upper blades 16 and the lower blades 20 may rotate at different relative rates, and their drives are independent of one another. This enhances the safety of the vehicle, since either the upper blades 16 may be driven alone, the lower blades 20 may be driven alone, or both groups of blades may be driven. Also, the vehicle may operate with the blades stationary, and by the selective control of the air vents described above.

As shown in FIG. 5, solar cells may be provided in the upper helicopter blades 16 and on the outer rim 12, and on any other available space on the top surface of the vehicle, so that the sun's energy may be converted into electrical energy for use in the vehicle, and appropriately stored. The electrical energy may be stored in capacitors in known manner, and used either directly to drive electric motors for the air compressors, or to supply other electrical energy for the vehicle.

Likewise, the under-surfaces of the upper blades 16 may be metalized, and the upper surfaces of the lower blades 20, may be formed of a resin material, as shown in FIG. 5, and appropriately placed grounding means and brushes provided for the metalized blades, so as to constitute a Wimhurst electrostatic generator. Then, as the blades rotate, the brushes are caused to generate a high voltage static electricity. The resulting electricity from the brushes may be stored in high voltage condensers and used, for example, to charge batteries incorporated into the electrical system of the vehicle. The condensers may be positioned in compartments in the rim 12 of the vehicle.

It is also possible to insulate the rim 12 from the remainder of the vehicle, and to provide an electric charge on the rim from the static electricity generator formed by the blades 16 and 20, and thereby facilitate the movement of the vehicle through the atmosphere. It has been found that a high voltage electrically charged body passes more easily through the atmosphere than one without such a charge, due to the ionization of air flowing around the attack edge of the aircraft.

As mentioned above, all empty spaces within the vehicle may be filled with light gas, such as helium, to reduce the effective weight of the vehicle as much as possible. Moreover, by selectively accumulating positive or negative static charges on one side of the vehicle, it will be attracted or repelled from other bodies having opposite or like charges. This latter effect can be used for docking purposes with an orbital space station.

As shown in FIG. 7, a flexible skirt 50 may be lowered from the periphery of the rim 12 for hovering purposes. The skirt may be retracted by any suitable mechanism when not in use.

As mentioned above, the pressurized air for the air bearings and turbine drive, as well as for the air cylinders 30 and 31, and 64, and for maneuvering the vehicle by direct supply to selected ones of the air vents 20, may be supplied by appropriate air compressors, such as by the compressor 60 of FIG. 3A. The turbine drive of the rotor blades 16 and 20 is advantageous in that it obviates the need for complicated mechanical coupling mechanisms between the drive motor and the rotor blades, as mentioned above. The central hull and all controlling equipment and accessories of the vehicle may be made air tight and water tight, for use of the vehicle, on or under the surface of water. When used underwater, water pumps will be used in place of air compressors to provide water bearings, rather than air bearings, and to cause water jets to issue through the vents 22, rather than air jets.

The invention provides, therefore, a saucer-like vehicle which is constructed in a relatively simple manner to enable the vehicle to exhibit all the characteristics of present day helicopters, insofar as vertical ascent and descent and hovering capabilities are concerned, and also to exhibit excellent maneuverability characteristics. The vehicle of the invention is relatively inexpensive to build, and it is simple to operate. As mentioned above, the vehicle of the invention may be designed as a toy, or as an actual full-sized vehicle for transporting passengers and cargo.

An important feature of the present invention is the drive of the rotor through the combined air bearings and air turbine concept, as described above. In the construction described herein, the rotor blades 16 and 20 are mounted on rotor rings which foat in air bearings, with high pressure air being directed against turbine blades in the rings, so as to drive the rotor. The relatively large diameter of the air bearings, together with the combined effect of the two inner and two outer air bearing/turbine mechanisms, provides enormous torque, and sufficient to drive the vehicle in a highly efficient manner.

The structure of the present invention also has a feature of a sealed annular chamber between the inner hub and outer rim, with selectively operated vents on the upper rim for controlling the direction of flight and the attitude of the aircraft, as described. As also described, electrical energy for the aircraft may be provided by causing the aircraft itself to operate as a generator, in the described manner, so that additional heavy electrical generating equipment is not required.

The invention provides, therefore, an improved saucer-like helicopter-type vehicle which has a minimum of moving parts, and which has a high safety factor. Moreover, the vehicle of the invention is relatively inexpensive to construct, so as to be commercially feasible. Moreover, it is light, and may be easily maneuvered.

While particular embodiments of the invention have been shown and described, modifications may be made, and it is intended in the following claims to cover all modifications which come within the spirit and scope of the invention.

What is claimed is:

1. A vehicle comprising: a disc-shaped body having a hub portion and a rim portion; means supporting said hub portion and said rim portion in spaced concentric relationship; upper and lower groups of helicopter blades; fluid bearing means supporting said helicopter blades on said hub portion and on said rim portion of said body for rotation in opposite directions about said hub portion and around the central vertical axis thereof, so as to create a gyroscopic effect and maintain the vehicle in a stable position, said fluid bearing means including a ring member supporting said helicopter blades and rotatable about said central vertical axis, said ring member having turbine blades therein; means for introducing pressurized fluid into said ring member and against said turbine blades to cause said ring member to be supported on films of the fluid and to produce rotation of said ring member about said central vertical axis; said upper and lower groups of helicopter blades being spaced axially from one another along the axis of rotation thereof to define a pressurized annular chamber between said hub portion and said rim portion, said rim portion having a series of vents disposed around the periphery thereof in communication with said pressurized annular chamber; means for selectively opening said vents to cause fluid from said pressurized chamber to issue therefrom as jets to control the vehicle; and means coupled to the blades of said upper group and of said lower group to vary the pitch thereof, so as to control the flow of pressurized fluid through said chamber and thereby to control the lift of the vehicle.

2. The vehicle defined in claim 1, and which includes solar cells mounted on the top side of the blades of said upper group to provide electrical energy for the aircraft.

3. The vehicle defined in claim 1, in which the blades of said groups are formed of electrically insulated material and of electrically conductive material, respectively, to constitute a static electricity generator for generating electricity for the aircraft.

4. The vehicle defined in claim 2, and which includes means for introducing electricity from said static electricity generator to said rim to create static electricity charges on said rim.

5. The vehicle defined in claim 1, and which includes a retractable skirt mounted on said rim to extend down from the periphery thereof to permit the vehicle to hover over a particular location.

* * * * *